United States Patent [19]

Savage

[11] Patent Number: 5,466,034

[45] Date of Patent: Nov. 14, 1995

[54] ASSEMBLY FOR VEHICLE BODY PANELS

[76] Inventor: William A. Savage, 3592 Lakeview Rd., Hamburg, N.Y. 14075

[21] Appl. No.: 129,769

[22] Filed: Sep. 30, 1993

[51] Int. Cl.$^6$ ................................................ B60J 5/04
[52] U.S. Cl. ................................ 296/191; 52/792.1
[58] Field of Search ..................... 52/802, 805; 296/191

[56] References Cited

U.S. PATENT DOCUMENTS

| 3,813,840 | 6/1974 | Wagenknecht | 52/802 |
| 3,861,081 | 1/1975 | Maskell | 49/70 |
| 4,175,936 | 11/1979 | Lough et al. | 55/385 |
| 4,724,637 | 2/1988 | Evans | 52/235 |

FOREIGN PATENT DOCUMENTS 2310947  10/1973  Germany ........................ 52/202

Primary Examiner—Carl D. Friedman
Assistant Examiner—Kien T. Nguyen
Attorney, Agent, or Firm—Phillips, Lytle, Hitchcock, Blaine & Huber

[57] ABSTRACT

The present invention comprises a vehicle body assembly, 10, comprised of a series of welded together aluminum, stainless base or galvanealed steel panels 12, in interfacing engagement with companion thermo-plastic or thermo-set plastic covering panels, 12, adapted to be pre-colored and resistant to heat, moisture and the environment. The base and covering panel are interposed in facing engagement through the use of a flange, 13, and formed channel, 14, and further secured together through the use of silicon, 19, within the channel and various portions of vehicle trim, 16, of metallic, chrome or rubber material. The use of the covering panel produces a method for assembling the vehicles requiring the base panels to be precisely configured and fitted without painting or previously required disassembly. The pre-colored covering panels are merely inserted into the companion base panel thereby forming a vehicle body of a specific configuration easy to assemble and repair.

18 Claims, 3 Drawing Sheets

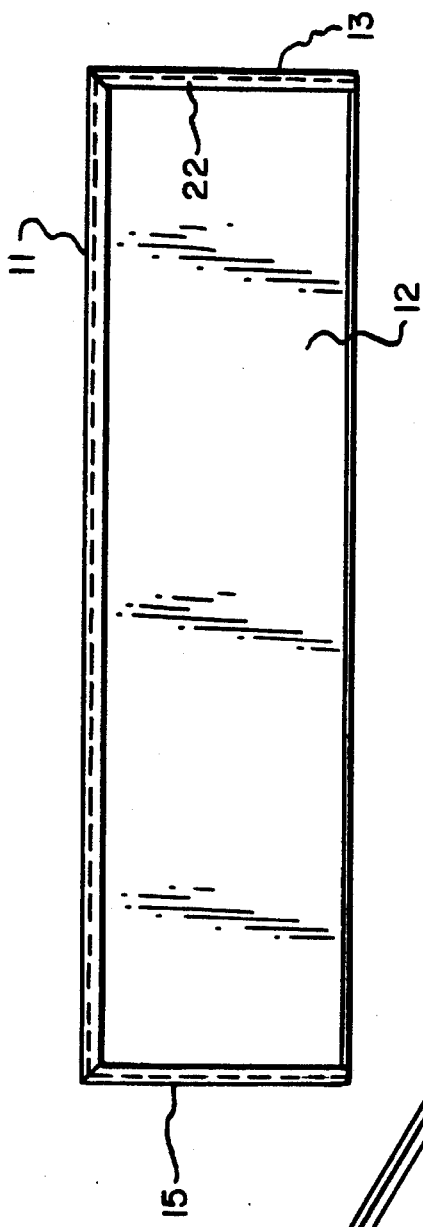
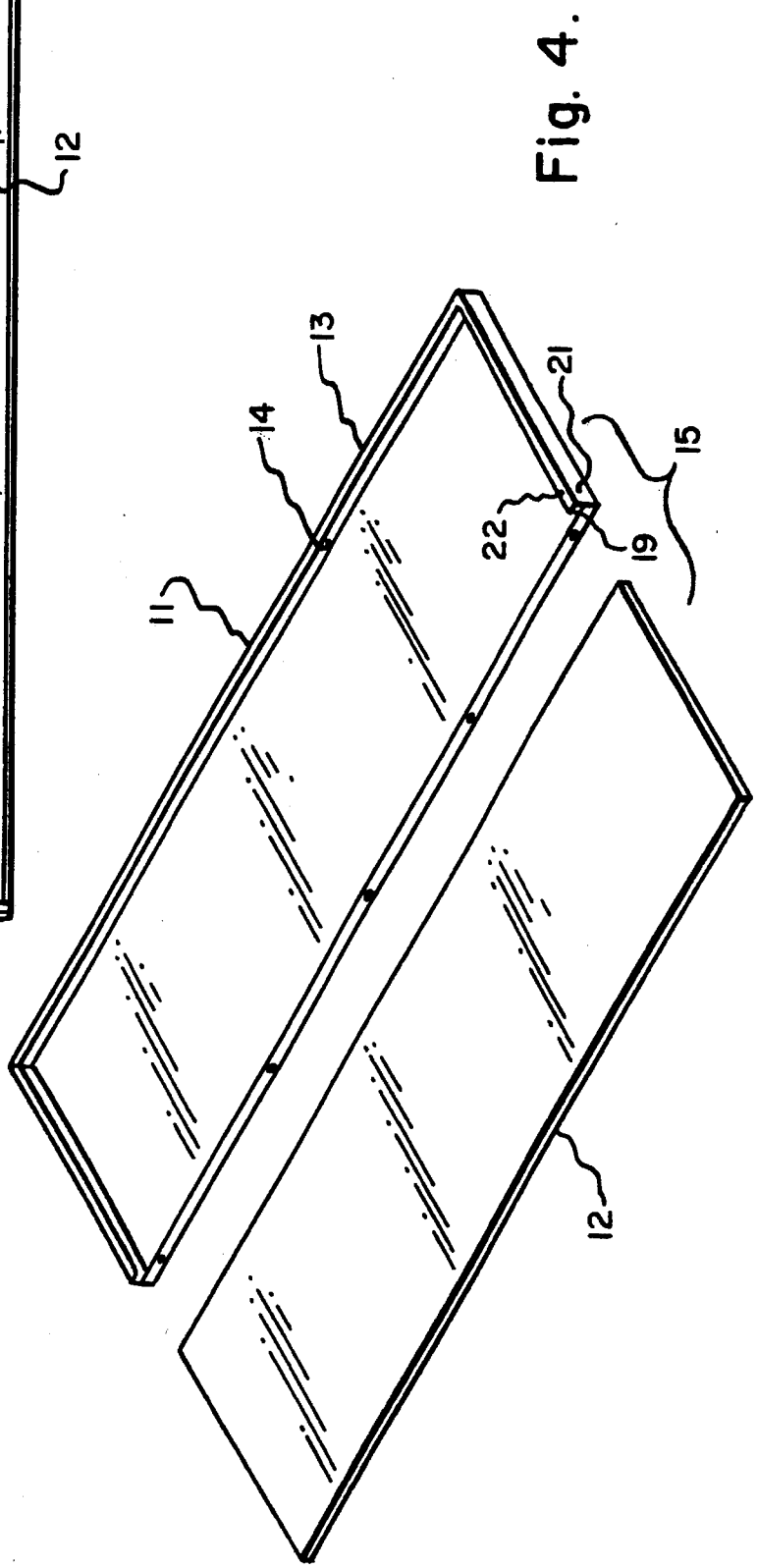

5,466,034

ASSEMBLY FOR VEHICLE BODY PANELS

TECHNICAL FIELD

The present invention relates generally to the field of the manufacture and assembly of vehicle body panels and specifically, to the configuration of body panels for custom designed emergency vehicles or fire trucks requiring durability, heat resistance and other wear properties.

BACKGROUND OF THE INVENTION

Many specific application vehicles, including fire trucks and emergency vehicles, are custom designed, manufactured and assembled with a high degree of precision and durability to withstand harsh operating conditions such as intense heat and moisture. As a result, most of the vehicles are comprised of low-corrosive stainless, aluminum or galvanealed steel panel sections welded or fitted together after fabrication, and then painted.

In the prior art, various specially configured panels together forming the body of a vehicle are first fabricated and then welded or fitted to determine whether the panels, in fact, have been properly configured in accord with the design specification or plan. Once the panels are fitted (i.e., welded) in their entirety to form the vehicle body, modifications, slight changes or adjustments can be made prior to paint application and final assembly. When in final form, the body panels are then separated (i.e., disassembled) for painting. This includes the manufacture and specification of storage binds, doors and other application-specific requirements of emergency vehicles such as fire trucks. Accordingly, the partially assembled vehicle is, in effect, disassembled for painting and then must be reassembled and trim added once the final process is completed. For example, in the case of a fire truck or rescue vehicle, certain body portions must be painted red, white or yellow, while other portions are trimmed in chrome or with other materials.

Accordingly, the manufacturing, assembly, disassembly, painting and reassembly process is extremely time-consuming and labor intensive. The same problem occurs if repairs must be done to certain body sections damaged during operation (i.e., a new section must be specially configured, mounted for fit and then disassembled for painting before reassembly).

The assembly of production model vehicles (i.e., not custom vehicles) also suffers from a similar problem relating to painting or coloring of the panels. In particular, since the panels are made of stainless steel, aluminum or galvanealed steel, the painting process is extremely difficult, time-consuming and prone to error. The hardness and other properties of these materials make it very difficult to prepare the surface for high precision painting and even a minor error in surface preparation can result in unevenness, peeling and rapid wear. Accordingly, it is desirable to have a method for coloring the body panels of such vehicles without painting, if possible.

With the advent of various non-corrosive plastics and other materials such as thermo-plastics or thermo-set plastics, it is now possible to configure vehicle body panel portions of these materials for use with stainless, aluminum or galvanealed steel. These advanced materials are also resistant to temperature and are easily adaptable to uses involving extreme heat, moisture and harsh environments. Moreover, these materials are also amenable to coloring through either the extrusion process or a simple painting process as part of their manufacture. The physical characteristics of these materials are extremely predictable, and it is possible to accurately assess expansion as a function of heat, temperature resistance, melting points, etc. As well, it is now possible to effectively use these materials in the manufacture and configuration of vehicle body panels and to overcome the disassembly and paint application problem identified in the prior art and, as of yet, unresolved.

The present invention contemplates the use of vehicle body panels configured from thermo-plastics or thermo-set plastics adapted to be retrofit or interfaced with the stainless steel, aluminum or galvanealed steel body panels of an emergency vehicle, fire truck or other vehicle. The thermo-plastic or thermo-set plastic panels are adapted to be held in place by fasteners, including a channel formed by a flange or by chrome or other trim normally used in the assembly of the vehicle. The panels are colored ahead of time and, once the vehicle body is assembled in a proper fit, the panels are interposed over the body panels and affixed into place using the fastening means such as the channel and flange or trim. As well, in the case of production vehicles, the panels are affixed at the time of assembly and without the need for painting the underlying body panels.

Accordingly, it is not necessary to disassemble the body for painting, and both assembly and repair time are substantially diminished without an effect on the integrity of the vehicle as a whole.

DISCLOSURE OF THE INVENTION

At the outset, it should be clearly understood that life reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The present invention generally comprises a method and assembly for vehicle body panels (e.g. 15) of a preselected configuration specifically adapted for use in emergency vehicles, namely, fire trucks and the like. Each panel comprises a stainless steel, aluminum or galvanealed steel base portion (e.g. 11) and a covering portion (e.g. 12) comprised of thermo-plastic or thermo-set plastic and adapted to fit into interfacing engagement with the base panel portion.

The base panel portion further includes a upwardly extending flange (e.g. 13) forming a channel (e.g. 14) around the perimeter of the panel configuration. The covering panel is inserted slidably into the base panel to form an assembly (e.g. 15) comprising the particular body panel portion. When assembled, a typical body panel portion (e.g. 15) is further held in place by metal trim (e.g. 16) often times chrome or other shiny metals typically used in the manufacture of the vehicle.

A silicon strip (e.g. 19) is interposed along the upper edge of the flange to further secure the covering panel within the base panel and to permit expansion and contraction with heat or cold temperatures. When only adjacent trim (e.g. 16) is used to hold a panel in place, silicon may also be interposed between the trim and the panel or on the panel internal surface between the panel and the underlying metal portion of the panel. The adjacent trim also serves to secure the particular panel assembly to an adjacent portion of the vehicle assembly.

Once the vehicle body portion comprised of the base panels is assembled, no disassembly is required and instead, the contemporaneously configured covering panels of a pre-color are interposed within the various flange members (or are held only by the adjacent trim) and secured by the chrome or metallic trim and silicon thereby providing an outer panel portion identical to that in previous vehicles without the need for disassembly and painting of the stainless, aluminum or galvanealed steel base portion.

Accordingly, the primary object of the invention is to provide a vehicle panel assembly for use in specially configured or custom vehicles such as fire trucks.

Another object of the invention is to provide a panel assembly that does not require disassembly prior to painting, yet is adaptable to withstand changes in temperature and operation in harsh environments.

Still another object of the invention is to provide a method for assembling vehicle body panels of custom or special configuration in an efficient and simpler manner than the prior art.

Yet another object of the invention is to provide a method for assembling vehicle body panels for production vehicles comprised of stainless steel, aluminum, galvanealed steel or other similar materials wherein painting is obviated.

These and other objects of the invention are and will become apparent from the foregoing and ongoing specification, drawing figures and claims.

DESCRIPTION OF THE DRAWING FIGURES

FIG. 3 is a top plan view of the covering panel interposed within the base panel.

FIG. 4 is a perspective view of the base panel and covering panel.

MODES OF CARRYING OUT THE INVENTION

The present invention comprises improved body panels and a method for assembling custom designed and manufactured panels for vehicle bodies such as fire trucks, 10, where tolerances and precision are critical not only in assembly and manufacture, but also in operation. The present invention maintains the manufacturing and operational precision required for such vehicles, while significantly decreasing the time and operations necessary for effective manufacture and assembly of the vehicles. As set forth above, the present invention alleviates the need to assemble each of the specially configured panels to determine exactness of fit and disassemble the identical panels for painting and finishing. The present invention also provides body panels having the qualities and characteristics of the prior art; i.e., resistivity to heat, moisture and environmental conditions necessary for use with emergency vehicles. The present invention further provides enhanced performance after assembly by permitting relatively simple and easy repair of damaged panels in most instances. As well, the present invention is adaptable for use with production vehicles thereby permitting such vehicles to be assembled without performing a difficult painting operation.

Figure 1:
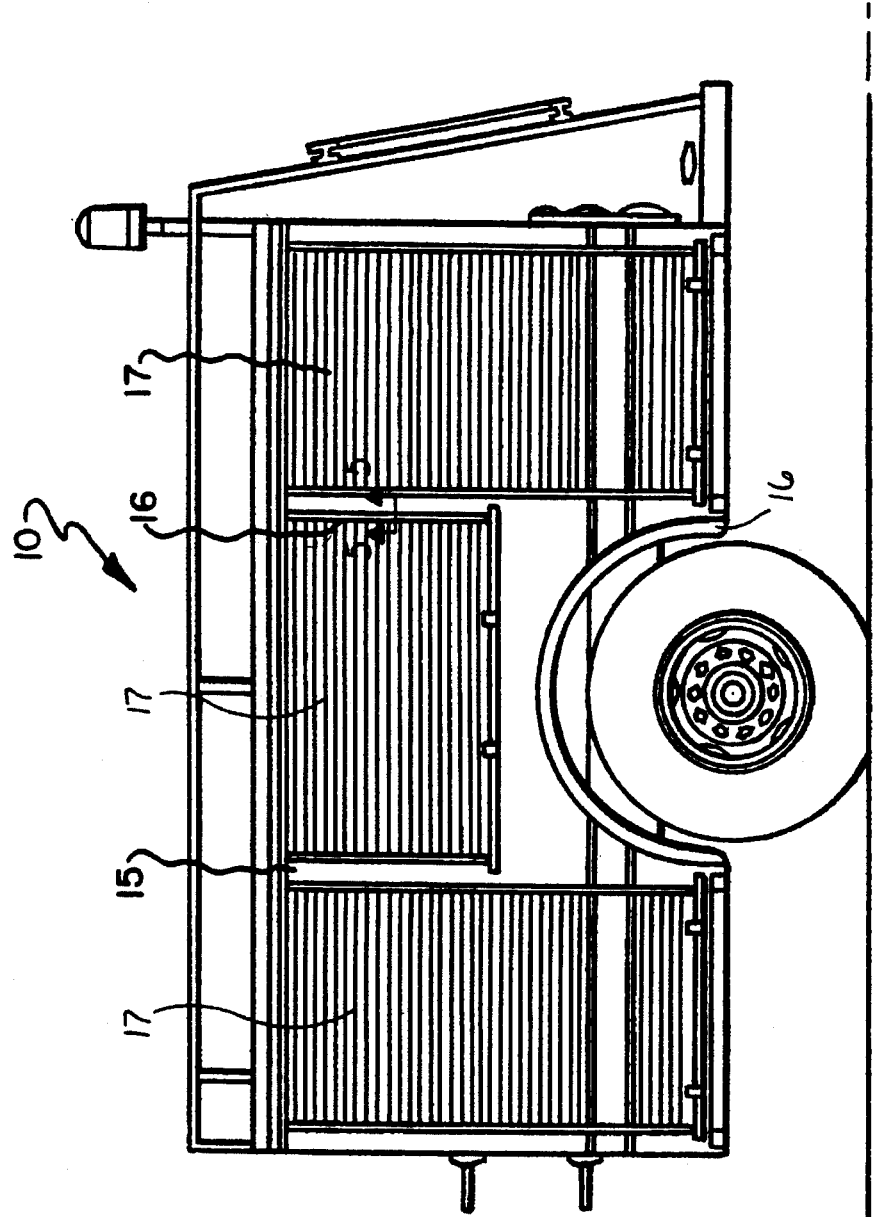
FIG. 1 is a side elevation of a fire truck showing panels in place.

Adverting first to FIG. 1, a fire truck body portion, 10, is shown to be comprised, in general, of a series of specially designed and configured body panels, 15, and like designed doors, 17, typically seen on fire trucks and other types of emergency vehicles. The vehicle body panels are generally comprised of stainless steel, aluminum or other low-corrosive materials (galvanealed steel) to avoid the wear and tear attendant to operation of the vehicle in harsh environments of enhanced heat, moisture and speed.

The panels (e.g. 15 and 17) forming the body portion of the vehicle are normally specially configured from stainless steel, aluminum or galvanealed steel according to customer specifications or demands, and are then welded together forming body portion 10, which is then placed on the truck frame, 24, to determine fit, need for refinishing and operational efficiency. Once satisfactory, the body portion is then removed from the truck frame for final finishing and painting when appropriate. For example, body panel portion 15 would typically be "visibility" red, yellow or white in a fire truck while door cover portions 17, might be either finished in identical colors or with a bright or shiny finish. After assembly, trim or stripping 16 is added usually in a chrome or other metal finish to complete the body assembly after welding and painting of the body panel segments. In the case of a vehicle produced using the present invention, the painting step is eliminated and the panels are fit and assembled at the same time the vehicle is assembled without the need for "fitting" or pre-assembly.

Adverting now to FIGS. 3 and 4, an example is shown of a typical panel assembly, 15, a door assembly for purposes of illustration. It should be emphasized that any additional or other specially configured body panel portions are comprised of the same elements of different or other preselected shape or size depending upon the design of the vehicle.

In particular, assembled panel 15 is shown to be generally comprised of a base panel, 11 and an engaging covering panel, 12. Each of the panels, 11 and 12 are shown to be, in the present configuration, substantially planar members of rectangular shape; however, as set forth above, the panels could be configured to any panel shape necessary for the vehicle design and assembly.

Adverting in particular to FIG. 4, base member 11 is shown in the preferred embodiment to have interposed on the perimeter edge of three of its sides an upwardly extending flange portion 13. Flange portion 13 is specifically comprised of upwardly extending vertical side portion 21 and inwardly extending (i.e., toward the center body portion of base member 11) top flange portion 22. Together, flange 13 and base member 11 form a channel, 14, subscribed along three sides of rectangular base member 11.

The channel formed by the flange can be continuous or intermittent along any portion of the particular base member independent of the configuration of the particular member at issue. Depending upon the design requirements of the particular panel, the flange portion and defined channel only need be constructed in a manner sufficient to accept in interfacing engagement the covering panel, 12, as described below.

The invention also contemplates interfacing of the covering and base panels without the need of a flange or channel. Rather, the covering panel is affixed to the base panel and held in place only by the vehicle trim positioned around such assembly. Accordingly, in appropriate circumstances, it is not necessary for the base panel to have a flange and channel for assembly.

Continuing to advert to FIG. 4, covering panel 12 is configured in a substantially identical shape as base panel 11. As a result, covering panel 12 is constructed and configured to be adapted to interface with base panel 11 across the inner body portions of each. Moreover, covering panel 12 is also configured to be slidably engaged into channel 14 such that the base panel and covering panel, together, form a single assembly, 15.

As set forth above, single assembly 15 can be formed by merely interfacing the two panels and having the covering panel be secured to the base panel through the use of adjacent trim.

Covering panel 12 is comprised of any one of a variety of thermo-plastics or other plastics capable of being cut and configured into various shapes. Moreover, the thermo-plastics or thermo-set plastics may be either painted or extruded in preselected colors. It is also possible to choose a thermo-plastic material for use in the covering panel wherein the expansion characteristics of the material are predictable as a function of temperature, moisture and other environmental factors. Various thermo-plastics are also adapted to be resilient to road debris, marring or denting in the ordinary course of use. Covering panel 12 is interposed within channel 14 in facing engagement with base panel 11, and the covering panel is configured such that the "fit" between the two members will accommodate expansion of the covering panel with heat or moisture. Covering panel 12 is held in facing engagement by flange top portion 22 and also, by a strip of silicon or other type of rubberized material, 19, interposed either along the undersurface of top flange portion 22 or on the bottom surface of the channel formed by the flange and base member. Silicon strip 19 is adapted to further secure the covering panel in engagement with the base panel producing a more "solid" fit, yet accommodating expansion or contraction of the covering panel with heat or moisture; i.e., the silicon or rubber strip is adapted to "give" or deform when exposed to expansion pressure of the covering panel.

In the case where the covering and base panel forming the assembly are held only by adjacent trim, there is, of course, no flange or channel. Nonetheless, silicon can be applied between the adjacent trim and covering panel or, alternatively, between the interfacing surfaces of the base and covering panel to accommodate expansion and to provide a solid "fit."

Adverting now to FIG. 3, the typical assembly, 15, of a door panel demonstrates the fit of the covering panel slidably into interfacing engagement with the base panel thereby forming a single body panel member. Covering panel 12 is configured, either by extrusion or painting, in a particular color (e.g., red) and is adapted to be slidably removed from the underlying base panel in the event of the need for repair, re-coloring or replacement without the need for removing the entire base panel of the vehicle assembly.

Figure 2:
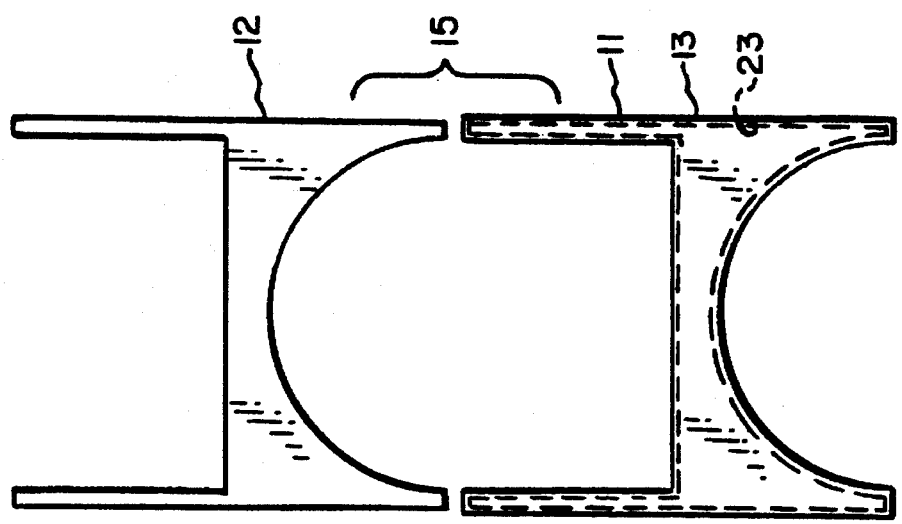
FIG. 2 is a side view of a base and covering panel for a wheel well.
Figure 5:
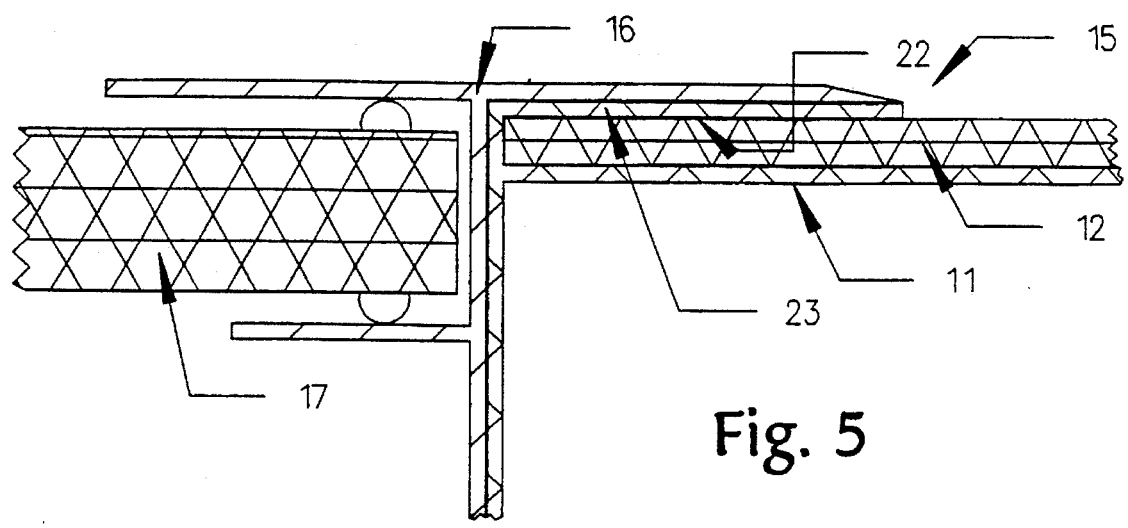
FIG. 5 is a fragmentary cross-sectional view of a panel assembly and door taken along line 5—5 in FIG. 1.

Adverting to FIGS. 1 and 2, a specially configured wheel panel is shown interposed on a vehicle body 10. This panel assembly, 15, includes a base member 11 and covering member 12 adapted to be held in position by an appropriately distributed series of flanges (not shown) or by trim only. The base panel, 11, would be welded or affixed to adjacent panels of the vehicle prior to interposition of the covering panel, 12. Once the base panels are welded together, the covering panels may then be inserted as shown in FIG. 1 to form the vehicle body, including non-functional body portions, doors and storage areas.

Covering panel 12 is further held in position through the use of metallic or plastic trim portion 16 as is described in FIG. 1. Such portions are normally present in the design and configuration of emergency vehicles and may be metallic, chrome, plastic or other materials. For example, adverting to FIG. 1, wheel well trim portion 16 serves to define the wheel opening of the vehicle body assembly 10 as well as further support and hold in place the bottom portion of panel assembly 15. Trim portion 16 normally rests on the outside facing portion 23 of flange top portion 22. Accordingly, based upon the design and specification of the particular vehicle, chrome, rubber or other trim portions of the body assembly are further used to secure and "finish" the panel assemblies.

The instant panel assembly also presents tremendous advantages in assembly of specially configured and custom vehicles. As set forth above, the prior method of assembly required each of the body panels of a vehicle to be configured and then welded together into a body portion. The body portion was then placed on the truck frame to determine "fit" and finishing requirements. The body portion was then removed from the truck frame for painting and finishing. After painting and finishing was complete, the body portion was replaced on the truck frame and the trim affixed to produce the vehicle body assembly. Similarly, repair of a panel of the vehicle often times required the panel to be removed in its entirety for replacement or repair in the case of severe damage. The present invention provides for a method of body panel assembly alleviating the need for disassembling and reassembling the vehicle either for initial construction or repair. Also, the identical process can be used to obviate painting of production vehicles of similar materials thereby decreasing labor costs and the time for assembly.

In operation, each of the base panels is configured according to the design of the vehicle and is adapted to include the various flanges and resulting channels for interposition in facing engagement of preconfigured and colored covering panels. The base panels are then assembled in the usual manner to form the vehicle assembly, 10. If the preconfigured base panels are deemed to "fit" sufficiently and to the tolerances required for operation, the appropriate and already colored covering panels are inserted into the channel portions as part of the assembly process. The silicon strips or other rubberized strips are further inserted into the channel to secure the covering panel in facing engagement with the underlying base panel. Thereafter, chrome, metallic or other trim associated with the vehicle design is interposed to the vehicle as part of the assembly operation and further serves to secure the covering panels in engagement with the base panel. As a result, it is not necessary to disassemble the vehicle for painting or finishing.

Moreover, as assembled, those portions of the vehicle having specific color are in place and the covering panels are adapted, much like the stainless steel, aluminum or galvanealed steel base panels, to resist heat, corrosion and are adapted to be freely expandable within the channel. The covering panels and base panels may be flexibly designed to any shape or size required to properly complete the vehicle design.

Similarly, repair can be accomplished by merely removing the covering panel in many cases and interposing a new panel therefor without the need for disturbing the underlying stainless or aluminum base panel. On account of the properties of the covering panel material (thermo-plastics or other suitable substitutes), the panels are easily colored either through the extrusion process or by painting prior to assembly.

Accordingly, the present invention, specifically applicable to emergency vehicles such as fire trucks requiring precise design and assembly, results in a body panel adapted to exhibit the same non-corrosive, heat resistant and environmental properties of stainless steel or aluminum while obviating the need for a burdensome assembly process including painting after initial assembly and finishing.

I claim:

1. A vehicle body panel assembly comprising:
    a specially configured base panel, said base panel having an interior portion and a perimeter portion thereabout;
    positioning means selectively interposed along said perimeter of said base panel at preselected points thereon;
    a specially configured covering panel of substantially identical dimension to said base panel, said covering panel replaceably interfaces with said base panel and to be secured and positioned on said base panel by said positioning means and wherein said covering panel is able to expand or contract while interfacing with said base panel and secured by said positioning means;
    facing means engaging said positioning means and further secures and positions said covering panel to said base panel and another portion of said vehicle body.

2. The vehicle body panel assembly according to claim 1 wherein said base panel is comprised of stainless steel or aluminum.

3. The vehicle body panel assembly according to claim 1 wherein said positioning means comprises a continuous raised flange of preselected height along said base member perimeter, said flange formed to comprise a channel on said perimeter of said base panel for receiving said covering panel.

4. The vehicle body panel assembly according to claim 1 wherein said positioning means comprises trim interposed along said perimeter of said base panel and said covering panel.

5. The vehicle body panel assembly according to claim 1 wherein said covering panel is comprised of thermo-plastic or thermo-set plastic.

6. The vehicle body panel assembly according to claim 1 wherein said covering panel is a predetermined color prior to interfacing said base panel.

7. The vehicle body panel assembly according to claim 1 further comprising sealing means interposed between said positioning means and said covering panel or between said covering panel and said base panel for further securing and positioning said base panel and said covering panel together.

8. The vehicle body panel assembly according to claim 7 wherein said sealing means is silicon.

9. The vehicle body panel assembly according to claim 1 wherein said covering panel is adapted to expand and contract as a function of temperature.

10. The vehicle body panel assembly according to claim 3 wherein said facing means is substantially a planar strip having an upper surface and a lower surface, where its lower surface is interposed on the top surface of said flange means at one position thereof and on another portion to said body of said vehicle.

11. The device according to claim 1 wherein said vehicle body is an emergency vehicle.

12. A vehicle body panel assembly comprising:
    a base panel specifically configured to form a portion of said body, said base panel having an interior portion and a perimeter portion thereabout;
    a flange interposed along a preselected portion of said perimeter of said base panel;
    a covering panel specifically configured of substantially identical dimension as said base panel and replaceably interfaces therewith, said covering panel further adapted to be secured and positioned in interfacing engagement with said base panel by said flange and wherein said covering panel is adapted to expand or contract when secured and positioned in interfacing engagement with said base panel;
    a facing strip simultaneously engaging a portion of said flange and another portion of said vehicle body, said facing strip further securing and positioning said covering panel in interfacing engagement with said base panel.

13. The vehicle body panel according to claim 12 further comprising sealing means interposed between said flange and said covering panel for further securing said base panel and covering panel in interfacing engagement.

14. The vehicle body panel assembly according to claim 13 wherein said sealing means is silicon.

15. The vehicle body panel assembly according to claim 13 wherein said base panel is comprised of stainless steel or aluminum.

16. The vehicle body panel assembly according to claim 13 wherein said covering panel is comprised of a thermo-plastic.

17. The vehicle body panel assembly according to claim 13 wherein said covering panel expands and contracts as a function of temperature.

18. The vehicle body panel assembly according to claim 13 wherein said covering panel is a predetermined color prior to interfacing said base panel.

* * * * *